(12) United States Patent
Ballesteros et al.

(10) Patent No.: US 10,049,394 B2
(45) Date of Patent: Aug. 14, 2018

(54) APPARATUS AND METHOD FOR PERFORMING SECURE TRANSACTIONS WITH A DIGITAL DEVICE

(71) Applicant: INTEL CORPORATION, Santa Clara, CA (US)

(72) Inventors: Miguel Ballesteros, Roseville, CA (US); Abhilasha Bhargav-Spantzel, Santa Clara, CA (US)

(73) Assignee: INTEL CORPORATION, Santa Clara, CA (US)

( * ) Notice: Subject to any disclaimer, the term of this patent is extended or adjusted under 35 U.S.C. 154(b) by 647 days.

(21) Appl. No.: 14/582,970

(22) Filed: Dec. 24, 2014

(65) Prior Publication Data

US 2016/0189258 A1    Jun. 30, 2016

(51) Int. Cl.
*G06Q 30/06* (2012.01)
*G06Q 20/32* (2012.01)
*G06Q 20/12* (2012.01)
*G06Q 20/40* (2012.01)

(52) U.S. Cl.
CPC ......... *G06Q 30/0609* (2013.01); *G06Q 20/12* (2013.01); *G06Q 20/32* (2013.01); *G06Q 20/3227* (2013.01); *G06Q 20/40145* (2013.01)

(58) Field of Classification Search
CPC .... G06Q 20/12; G06Q 30/0609; G06Q 20/32; G06Q 20/3227; G06Q 20/40145
USPC ...................................... 705/26.35
See application file for complete search history.

(56) References Cited

U.S. PATENT DOCUMENTS

| 2006/0074815 | A1* | 4/2006 | Ishida | G06Q 20/367 705/71 |
| 2014/0300540 | A1* | 10/2014 | Beadle | G07C 9/00007 345/156 |
| 2015/0365384 | A1* | 12/2015 | Rider Jimenez | H04L 63/0435 705/77 |

OTHER PUBLICATIONS

Zhou Zhe et. al., Acoustic Fingerprinting Revisted: Generate Stable Device ID Stealthily Inaudible Sound Nov. 7, 2014, The Chinese University of Hong Kong, p. 1-12 (Year: 2014).*

* cited by examiner

*Primary Examiner* — Michael Misiaszek
*Assistant Examiner* — Matthew W Todd
(74) *Attorney, Agent, or Firm* — Womble Bond Dickinson (US) LLP (57) ABSTRACT

Method to perform secure transactions with a digital device starts with microphone receiving signal generated by the digital device. Signal includes product information in inaudible portion of signal that identifies at least one product associated with a timeframe of signal. Trusted execution environment (TEE) generates start signal based on first sensor signal from first sensor that may be inertial sensor. Start signal is generated when first sensor signals indicate that user wishes to perform transactions with digital device. TEE verifies an origin of the product information to determine integrity of the origin and data. Display device displays purchasing information to a user that is based on the product information. TEE authenticates user based on second sensor signal from second sensor that may be biometrics sensor. TEE completes transaction to purchase at least one product by providing payment information associated with user. Other embodiments are also described.

23 Claims, 4 Drawing Sheets

APPARATUS AND METHOD FOR PERFORMING SECURE TRANSACTIONS WITH A DIGITAL DEVICE

FIELD

An embodiment of the invention relate generally to an apparatus and a method for performing secure transactions with a digital device. Specifically, the invention relates to using product information stored in the inaudible portion of an audio or audio-visual signal generated by the digital device. The invention also relates to verifying the source of the product information (e.g., seller), authenticating the user, and performing the secure transaction to complete the purchase.

BACKGROUND

With the current consumer electronics devices being equipped to provide users access to the Internet, users are now able to shop for goods and services online with ease without having to set foot in a brick and mortar establishment. Often, the user may reach for their mobile electronic devices to search of goods or services that they see on television or in the movies or that they hear about on the radio. For instance, the user may see a clothing article that is being worn by an actor in a movie or television program that they wish to purchase.

A lack of details on the desired product may cause the user to have to conduct an extensive search using Internet search engines to locate a merchant's site that is selling the desired product. Further, this extensive search may ultimately not generate the merchant's site for the user to make his purchase or worse, the user may even be able to identify the desired product. Accordingly, it would be desirable for the consumer electronic device to be able to identify the products that are being displayed to the user or described in the audio signal to the user in order to further facilitate the user's purchase.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one. In the drawings.

DETAILED DESCRIPTION

In the following description, numerous specific details are set forth. However, it is understood that embodiments of the invention may be practiced without these specific details. In other instances, well-known circuits, structures, and techniques have not been shown to avoid obscuring the understanding of this description.

Figure 1:
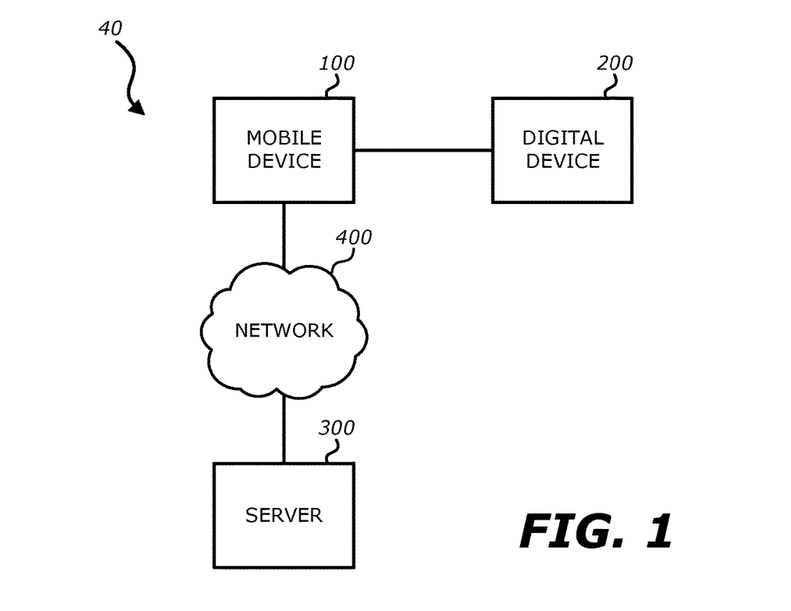
FIG. 1 illustrates a system in which an embodiment of the invention may be implemented.

FIG. 1 illustrates a system 1 in which an embodiment of the invention may be implemented. As shown in FIG. 1, the system 1 includes a mobile device 100 that receives audio or audio-visual signals from a digital device 200 and is communicatively coupled to a server 300.

The digital device 200 may be for instance a digital television that may be is adapted to receive transmissions from a content provider. Examples of "content providers" may include a terrestrial broadcaster, a cable or satellite television distribution system, or a company providing content for download over the Internet or other Internet Protocol (IP) based networks like an Internet service provider. In addition, the transmissions from the content providers may be a stream of digital content that is configured for transmission to the digital device 200 for viewing and/or listening. According to one embodiment, the transmission may contain MPEG (Moving Pictures Expert Group) compliant compressed video. A "scene" in the digital content may be generally defined as one or more frames of content, namely one or more frames video, one or more still images, or any combination thereof. For instance, as an example, a scene may include fifteen (15) consecutive frames of video. The electronic device may also be coupled to a digital media player (e.g., DVD player) to receive and display the digital content for viewing and/or listening. The digital device 200 in FIG. 1 comprises a housing that includes a display screen on the front face of the digital device 200 to display the visual part of an audio-visual content and speaker ports to output sound corresponding to the audio part of the audio-visual content. The digital device 200 may also be a radio device that receives transmissions from the content providers outputs audio signals through speaker ports. The audio signals may be radio broadcast signals. In other embodiments, the digital device 200 may also be, for instance, a desktop computer, a tablet computer, a personal digital media player, a notebook computer, laptop computer, a mobile telephone, or a theater.

In one embodiment, the signals generated by the digital device 200 may also include product information in an inaudible portion of the signal. For instance, the product information may be an identifier of at least one product that is shown in a scene of a television program that the user is watching. The product information may also be an identifier of at least one product that was mentioned during a radio broadcast. Accordingly, the product information may be a tag that includes an identifier (e.g., SKU, product identification number, etc.). The identifier may identify at least one product that is associated with a timeframe of the signal (e.g., the scene or frame at a given time of a programming show). In one embodiment, the product information is an identifier that points to purchasing information associated with the at least one product. Device 100 may transmit the product information to the server 300 in FIG. 1 which returns the purchasing information associated with the at least one product to the device 100. The server 300 may be an external remote server that communicates with the mobile device 100 via a network (not shown). The network may be: a cellular mobile phone network (e.g. a Global System for Mobile communications, GSM, network), including current 2G, 3G and 4G networks and their associated call and data protocols; and an IEEE 802.11 data network (WiFi or Wireless Local Area Network, WLAN) which may also support wireless voice over internet protocol (VOIP) calling.

In other embodiments, the product information further includes the purchasing information associated with the products associated with the timeframe of the signal. For example, a clothing item being worn by an actor in a first scene may be a product associated with the timeframe of the signal. In this embodiment, the inaudible portion of the signal may include compressed purchasing information for that clothing item. The compressed purchasing information may be processed (e.g., decompressed) to retrieve the purchasing information for that clothing item. Purchasing information may include a merchant website that is selling the product (e.g., clothing item), product details, price, etc.

In another embodiment, the signals generated by the digital device 200 may also only include the tags or metadata in the inaudible portion of the signal. The tags or metadata indicates the timeframe of the signal and further identifies the signal. In this embodiment, digital device 100 transmits the metadata to the server 300 that identifies at least one product that is associated with the timeframe of the signal, and a purchasing information associated with the at least one product. The server 300 may transmit the product information as well as the purchasing information associated with the at least one product to the digital device 100.

In one embodiment, the tags, metadata, and product information may be included in a separate signal from the audio or audio-visual signals generated by the digital device 200. The separate signal may be, for example, an infrared signal, WiFi signal, BlueTooth signal, Near Field Communication (NFC) signal, etc.

Figure 2:
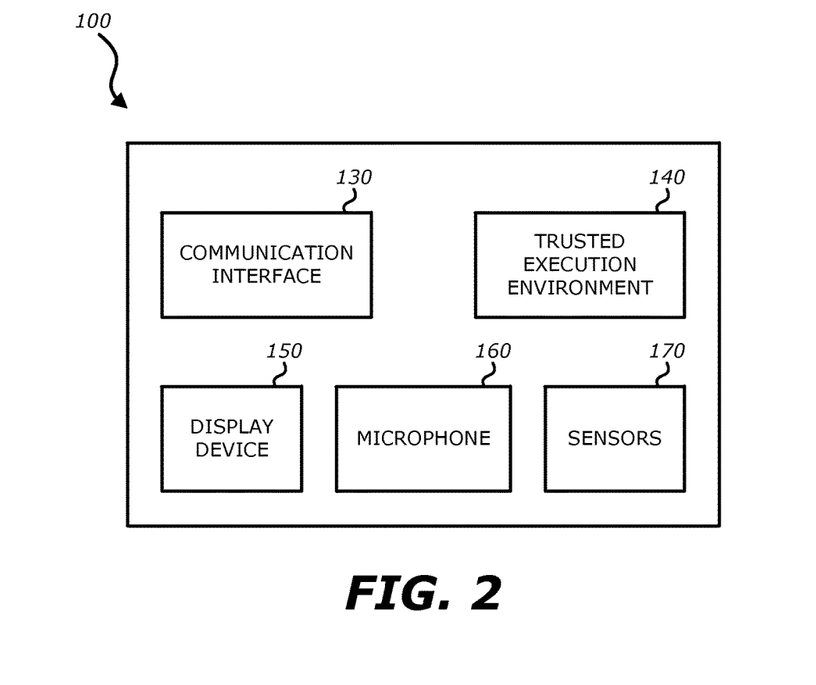
FIG. 2 illustrates a block diagram of a mobile device for performing secure transactions with a digital device according to one embodiment of the invention.

The mobile device 100 in FIG. 1 may be a mobile telephone communications device or a Smartphone. However, the electronic device may also be, for instance, a tablet computer, a notebook computer, or a wearable computer. FIG. 2 illustrates a block diagram of mobile device 100 for performing secure transactions with a digital device according to one embodiment of the invention. As shown in FIG. 2, the mobile device 100 includes a communication interface 130, a trusted execution environment 140, and input-output devices to receive data as well as provide data. For instance, mobile device 100 may include a display 150, audio devices such as at least one microphone 160, and a plurality of sensors 170.

In one embodiment, mobile device 100 may comprise a housing that includes the display 150 on the front face of mobile device 100. Display screen 150 may also include a touch screen. Mobile device 100 may also include one or more physical buttons and/or virtual buttons (on the touch screen) to receive a selection input from the user. For instance, the user may activate a virtual button on the touch screen to indicate that he wishes to purchase an item being displayed on the display screen 150.

Microphones 160 may be air interface sound pickup devices that convert sound into an electrical signal. Microphones 160 may be used to receive from the digital device 200 the signal that may be an audio signal or an audio-visual signal. The signal may also include the product information in the inaudible portion of the signal. Mobile device 100 may also include input-output components such as ports and jacks. For example, mobile device 100 may include an opening to form the microphone port.

Sensors 170 may include inertial sensors and biometrics sensors. The inertial sensor may include at least one of: a gyroscope that measures orientation or an accelerometer that measures proper acceleration in three directions, X, Y, and Z or in only one or two directions. The inertial sensor may generate inertial sensor signals that are used to determine the orientation and the movements of mobile device 100. The inertial sensor signals may further be analyzed to determine whether the user wishes to perform a secure transaction with the digital device 200 as described below. Biometric sensors may include sensors that are used to detect or recognize, for example, fingerprints, palm veins or prints, hand geometry, faces, irises, retinas, voice, DNA, etc. Biometric sensors may provide biometric sensor signals that are used to authenticate a user.

Mobile device 100 may also include the communication interface that includes wireless communications devices having communications circuitry such as radio frequency (RF) transceiver circuitry, antennas, etc. . . . In one embodiment, the microphone port, the speaker ports may be coupled to the communications circuitry to enable the user to participate in wireless telephone or video calls. A variety of different wireless communications networks and protocols may be supported in the wireless communications devices. These include: a cellular mobile phone network (e.g. a Global System for Mobile communications, GSM, network), including current 2G, 3G and 4G networks and their associated call and data protocols; and an IEEE 802.11 data network (WiFi or Wireless Local Area Network, WLAN) which may also support wireless voice over internet protocol (VOIP) calling.

Mobile device 100 also includes trusted execution environment (TEE) 140 that controls the mobile device 100 to receive the signal from the digital device 200 with the tags or metadata and the product information included in the inaudible range of the signal. TEE 140 also verifies the origin and integrity of the tags or metadata and product information to create a secure mobile commerce system that directs a user to an authentic merchant's site on the mobile device 100 and secures the purchase transaction in real time upon receiving the selection user input on, for example, the touch screen of the mobile device 100. In one embodiment, TEE 140 may be included in a system-on-chip (SOC) in the mobile device 100.

Figure 3:
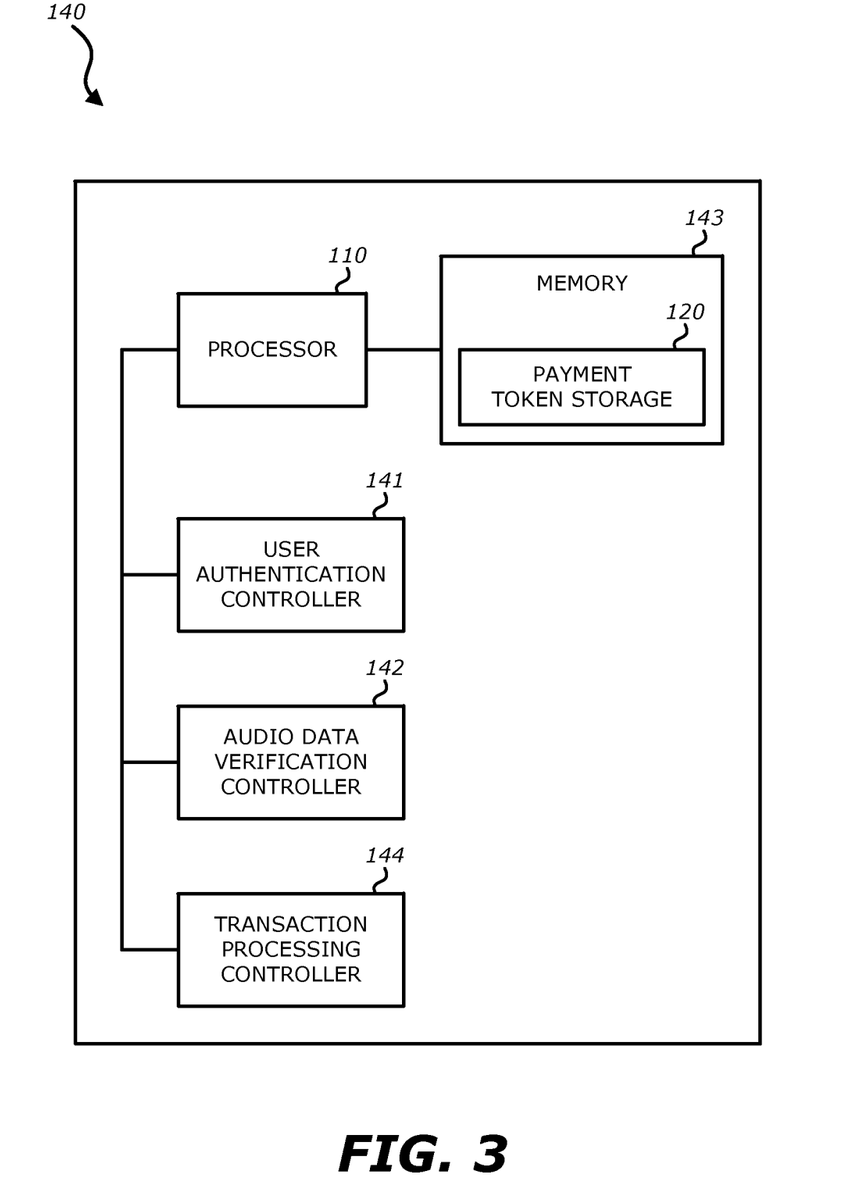
FIG. 3 illustrates a block diagram of the trusted execution environment (TEE) included in the mobile device in FIG. 2 according to one embodiment of the invention.

FIG. 3 illustrates a block diagram of TEE 140 included in the mobile device 100 in FIG. 2 according to one embodiment of the invention. As shown in FIG. 3, TEE 140 includes a processor 110, memory device 120 that includes a payment token storage 143, user authentication controller 141, audio data verification controller 142, and a transaction processing controller 144.

Processor 110 included in TEE 140 may include a processor, such as a microprocessor, a microcontroller, a digital signal processor, or a central processing unit, and other needed integrated circuits such as glue logic. The term "processor" may refer to a device having two or more processing units or elements, e.g. a CPU with multiple processing cores. Processor 110 may be used to control the operations of TEE 140 by executing software instructions or code stored in the memory 120. Memory 120 may include one or more different types of storage such as hard disk drive storage, nonvolatile memory, and volatile memory such as dynamic random access memory. In some cases, a particular function as described below may be implemented as two or more pieces of software in the memory 120 that are being executed by different hardware units of a processor 110. In one embodiment, memory 120 includes a payment token storage 143, which securely stores the payment token that identifies the user's payment credentials such as the user's identification, credit card information, banking information, passwords to various banking institutions and Personal Identification Numbers (PINs) associated with credit cards, etc.

In one embodiment, processor 110 may used to detect the user's interest in activating the TEE 140 to perform the secure transaction with the digital device 200. Processor 110 may receive the inertial sensor signals from the inertial sensor included in sensors 170. Based on the orientation and the movements of the mobile device 100, the processor 110 may determine that activation of the secure transaction function is desired. For instance, in one embodiment, a user tapping the mobile device 100 three times may indicate that he wishes to activate the function perform the secure transaction using the inaudible portion of the signals from the digital device 200. In this embodiment, the orientation and movement patterns of the mobile device 100 that represent the tapping of the mobile device 100 three times may be stored in the memory 120. The processor 110 may compare the inertial sensor signals to the patterns stored in memory 120 to determine whether this predetermined action on the mobile device 100 (e.g., tapping the device 100 three times) is being performed. In other embodiments, the predetermined action on the mobile device 100 that indicates to the processor 110 that the user wishes to perform a secure transaction is the action of reaching for the mobile device 100 and bringing the mobile device 100 to the user's face. In this embodiment, the orientation and patterns associated with this predetermined action are stored in the memory 120 to be used by the processor 110 as a basis of comparison to the signals from the inertial sensor. Accordingly, based on an analysis of the inertial sensor signals, the processor 110 may determine that the predetermined action on the mobile device 100 has occurred and may generate a start signal.

In one embodiment, processor 110 may used to control the audio data verification controller 142. The processor 110 may cause the audio data verification controller 142 to verify the origin and integrity of the data that is received from the digital device 200 or from the server 300. For instance, the audio data verification controller 142 may assess the data in the inaudible portion of the signal from the digital device 200 which may include the tags, the metadata, the product information and/or the purchasing information. In one embodiment, based on the verification of the origin of the product information, the audio data verification controller 142 may determine whether the merchant site that is associated with the product information is legitimate before signaling to the display 150 to display the merchant site for the user to continue with the purchase.

Once the merchant site is displayed on display 150, the user may provide an input (e.g., via the touch screen, keyboard, etc.) that indicates that he wishes to purchase the product (e.g., the clothing item that was worn by the actor in a scene). In one embodiment, processor 110 may be used to control the user authentication controller 141 to authenticate the user when a selection input is received from the user that indicates to proceed with a purchase. The user authentication controller 141 may signal to the display 150 to indicate that the user's biometrics are to be provided. Using the biometric sensors included in sensors 170, the user authentication controller 141 may receive the biometrics signals and determine whether the user that wishes to make the purchase is the correct and authorized user of the mobile device 100. For instance, biometric sensors may obtain the user's fingerprints and compare these fingerprints to the user's confirmed fingerprints that are stored in the memory 120. In another example, the mobile device 100 is a wearable computer such that the biometric sensors may detect the user's DNA or hand geometry, for example, to authenticate the user.

Once the user is authenticated, processor 110 may further control the transaction processing controller 144 to complete the transaction securely using the payment token stored in payment token storage 143. By using the payment token, the payment credentials associated with the user are protected. Transaction processing controller 144 may communicate with a merchant site which may be included in server 300 via the communication interface 130 to complete the transaction.

Moreover, the following embodiments of the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a procedure, etc.

Figure 4:
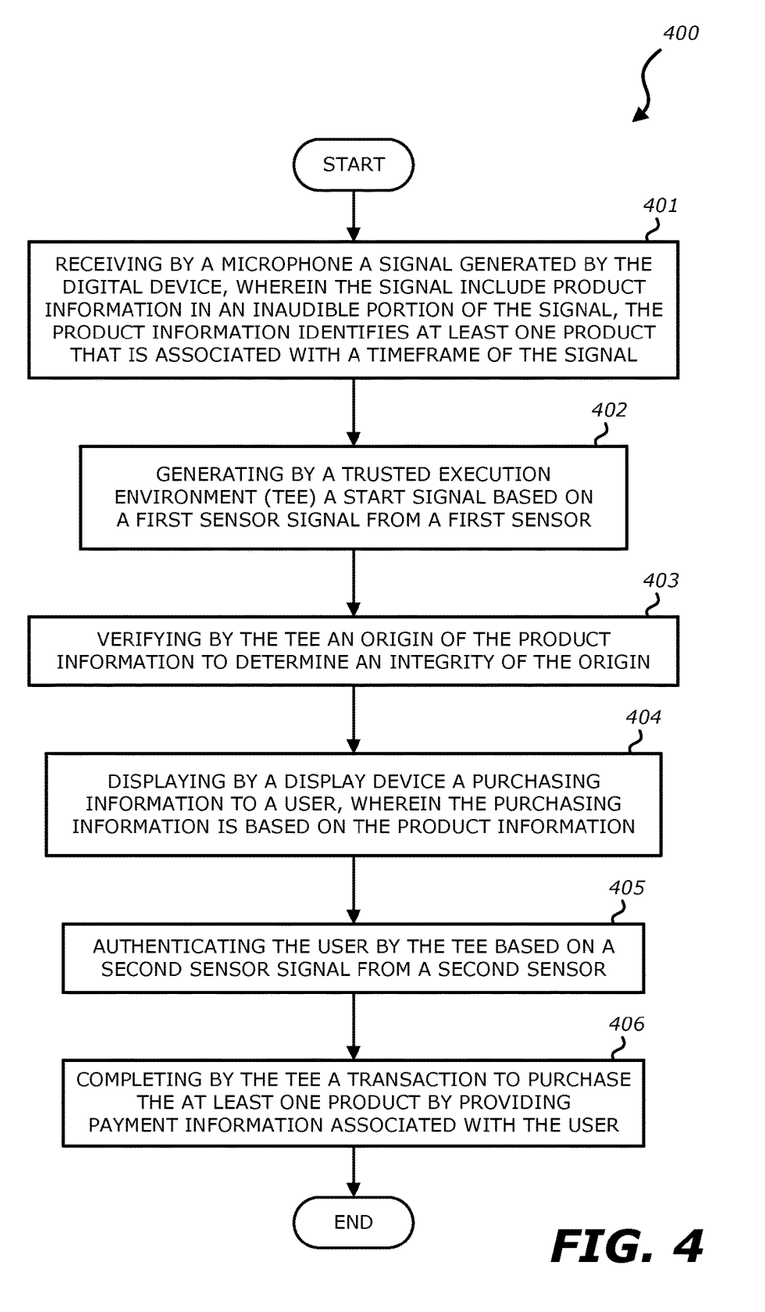
FIG. 4 illustrates a flow diagram of an example method for performing secure transactions with a digital device according to an embodiment of the invention.

FIG. 4 illustrates a flow diagram of an example method 400 for performing secure transactions with a digital device according to an embodiment of the invention. The method 400 starts at Block 401 with a microphone 160 receiving a signal generated by the digital device 200. The signal includes product information in an inaudible portion of the signal that identifies at least one product that is associated with a timeframe of the signal. The product information may also include the merchant site that is selling the at least one product. Accordingly, the digital device 200 is a data source that is broadcasting the product information (e.g., item ID, merchant site, etc.) in correlation with the main content. In some embodiments, the product information is a tag or metadata that identifies the at least one product. In this embodiment, the TEE 140 transmits the product information to a server and receives from the server the purchasing information associated with the at least one product. For instance, the TEE 140 may transmit the product identifier for a hat worn by an actor in a timeframe of the signal (e.g., from 0 to 0:15 of a movie) to the server 300. The server 300 may search for the hat that is identified by the product identifier and transmit to the TEE 140 a merchant website (e.g., Saks.com™) that sells the hat, the details related to the hat such as the fabric, the brand of the hat, the price, etc. In another embodiment, the product information that is included in the inaudible portion of the signal includes the purchasing information such that the TEE 140 does not need to obtain the purchasing information from the server 300. In this embodiment, the purchasing information is included in the product information but may be compressed. Accordingly, TEE 140 may retrieves and process a compressed purchasing information that is included in the product to obtain the purchasing information. In another embodiment, the TEE 140 may obtain some of the purchasing information from the compressed purchasing information included in the product information and some of the purchasing information from the server 300 by transmitting the product information to the server 300.

While the digital device 200 is broadcasting the product information (e.g., item ID, merchant site, etc.) in correlation with the main content, the mobile device 100 may be listening in a low power mode (e.g., the audio subsystem including the microphone 160 may be the only component that is activated.) At Block 402, TEE 140 generates a start signal based on a first sensor signal from a first sensor 170. The first sensor is an inertial sensor such as an accelerometer or a gyroscope. In some embodiments, TEE 140 determines based on the orientation and the movements of the mobile device 100 whether the user wishes to activate the secure purchasing function. Thus, when the user is interested in purchasing a product that is displayed on the digital device 200 or mentioned in the audio stream of the digital device 200, the user may reach for the mobile device 100 and perform an action on the mobile device 100 that is predetermined to indicate that the user wishes to activate the secure purchasing function as described herein. In some embodiments, once the start signal is activated, TEE 140 may process the received product information that was most recently received. For instance, the memory 120 may include a buffer (e.g., FIFO) that stores product information for a latest set of products. The number of queued product information data may be configurable. In another embodiment, the start signal is activated when it is determined by assessing the first sensor signals that the user is interested in a given product and thus, wishes to activate the secure purchasing function. In this embodiment, the user may wish to review the products at a later time (e.g., at the end of the movie/show, end of the day etc.) Accordingly, the user may select multiple products at different times. The products are queued in the buffer for review at a later time. In this embodiment, the user may not view each of the products prior to the products being queued for later review. In one embodiment, the products are automatically queued upon activation of the start signal when the user is determined to express interest in a product.

At Block 403, TEE 140 verifies an origin of the product information to determine integrity of the origin. For instance, TEE 140 may verify the product information or the purchasing information to determine whether the merchant site is legitimate. Once it is determined by TEE 140 that the merchant site is legitimate, TEE 140 may fetch the purchasing information for the at least one product from the merchant site using the product information (e.g., product id).

At Block 404, a display device 150 displays purchasing information to the user. The purchasing information may be based on the product information. For example, the purchasing information may include the merchant site, the price of the at least one product, the details on the at least one product, etc. In one embodiment, the display device 150 also displays virtual buttons that may be activated by the user to indicate that he wishes to continue with the purchase of the at least one product. In another embodiment, the display device 150 may display virtual buttons that may be activated by the user to indicate that he wishes to save the at least one product for later consideration. In this embodiment, TEE 140 may store the product information and/or the purchasing information in memory 120 or in a queue in memory 120 for further processing. The user may revisit the stored products using mobile device 100 at a later time.

At Block 405, TEE 140 authenticates the user based on a second sensor signal from a second sensor 170. The second sensor 170 may be biometrics sensors that are used to authenticate and confirm that the user who is trying to purchase the at least one product from the merchant site is the authorized user of the mobile device 100. TEE 140 thus ensures that it is not malware or an unauthorized user using the mobile device 100 to make purchases.

At Block 406, TEE 140 completes a transaction to purchase the at least one product by providing payment information associated with the user. The payment information may be provided to a merchant site that was identified in the purchasing information. The payment information may be protected via encryption for transmission to and from the merchant site. TEE 140 may also use the payment token that is stored in the payment token storage 143 to process the transaction with the merchant site and sends the authorization request to complete the transaction with the merchant site.

In some embodiments, mobile device 100 may return to low power mode (e.g., only the microphones 160 remaining active) if a predetermined amount of time is reached and the inertial sensor signals do not indicate that the user wishes to perform a secure transaction with the digital device 200 or if a user input is received indicating to the mobile device 100 to return to low power mode. In some embodiments, the mobile device 100 in low power mode may passively receive signals from the digital device 200 until the digital device 200 stops transmitting the signals or until the user is out of the range for the microphones 160 to receive the signals from the digital device 200. For instance, the mobile device 100 may be out of the range when the mobile device 100 is not in the same room as the digital device 200.

Figure 5:
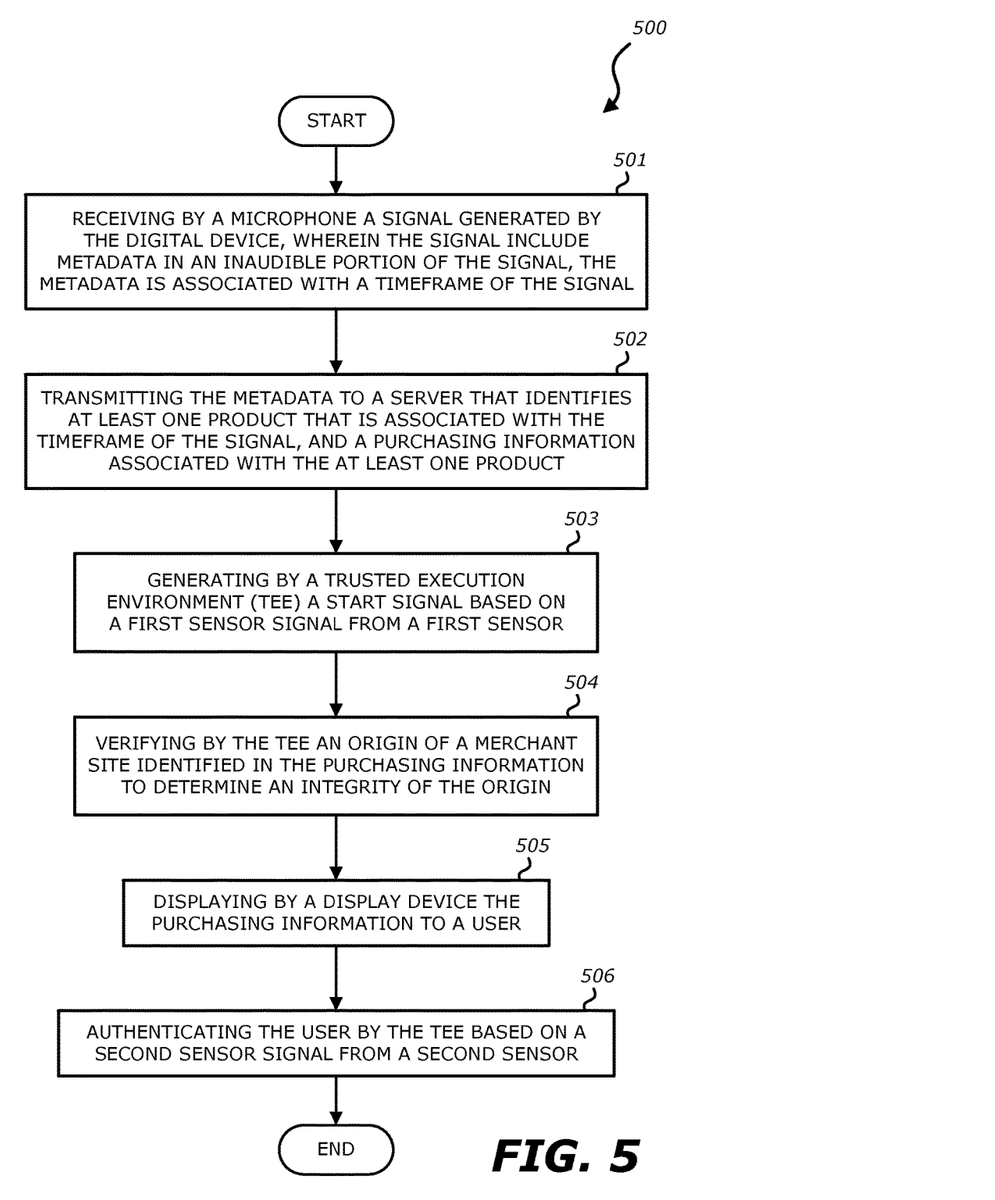
FIG. 5 illustrates a flow diagram of an example method for performing secure transactions with a digital device according to another embodiment of the invention.

FIG. 5 illustrates a flow diagram of an example method 500 for performing secure transactions with a digital device according to an embodiment of the invention. The method 500 starts at Block 501 with a microphone receiving a signal generated by the digital device. The signal includes metadata in an inaudible portion of the signal that is associated with a timeframe of the signal. The metadata may also further identify the signal (e.g., identification of the programming, the channel, the movie title, etc.). At Block 502, the mobile device 100's processor 110 via the communication interface 130 transmits the metadata to a server that identifies at least one product that is associated with the timeframe of the signal and a purchasing information associated with the at least one product. For instance, server 300 may provide a service that determines, based on the metadata that identifies (i) a timeframe (e.g., timeframe 0 to 0:15) and (ii) a television program, what products were displayed during that timeframe. The server 300 may then transmit the product information (e.g., product identification, merchant site, etc) and the purchasing information (e.g., webpage displaying the product for purchase, the price, the details of the product, etc.) to the mobile device 100.

As in the method 400 in FIG. 4, at Block 503, TEE 140 generates a start signal based on a first sensor signal from a first sensor 170. The first sensor 170 may be an inertial sensor that generates inertial sensor signals from which the TEE 140 can determine that the user wishes to activate the system to perform a secure transaction with the digital device 200. Upon generating the start signal, the mobile device 100 may exit the low power mode. As in the method 400 in FIG. 4, at Block 504, the TEE 140 verifies an origin of a merchant site identified in the purchasing information to determine an integrity of the origin and at Block 505, the display device 150 displays the purchasing information to a user. At Block 506, TEE 140 authenticates the user based on a second sensor signal from a second sensor that is a biometrics sensor 170 and at Block 507, TEE 140 completes by the TEE a transaction to purchase the at least one product by providing payment information associated with the user.

An embodiment of the invention may be a machine-readable medium having stored thereon instructions which program a processor to perform some or all of the operations described above. A machine-readable medium may include any mechanism for storing or transmitting information in a form readable by a machine (e.g., a computer), such as Compact Disc Read-Only Memory (CD-ROMs), Read-Only Memory (ROMs), Random Access Memory (RAM), and Erasable Programmable Read-Only Memory (EPROM). In other embodiments, some of these operations might be performed by specific hardware components that contain hardwired logic. Those operations might alternatively be performed by any combination of programmable computer components and fixed hardware circuit components. In one embodiment, the machine-readable medium includes instructions stored thereon, which when executed by a processor, causes the processor to perform the method for dynamically adapting the playback volume on an electronic device as described above.

In the description, certain terminology is used to describe features of the invention. For example, in certain situations, the terms "component," "unit," "module," and "logic" are representative of hardware and/or software configured to perform one or more functions. For instance, examples of "hardware" include, but are not limited or restricted to an integrated circuit such as a processor (e.g., a digital signal processor, microprocessor, application specific integrated circuit, a micro-controller, etc.). Of course, the hardware may be alternatively implemented as a finite state machine or even combinatorial logic. An example of "software" includes executable code in the form of an application, an applet, a routine or even a series of instructions. The software may be stored in any type of machine-readable medium.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting. There are numerous other variations to different aspects of the invention described above, which in the interest of conciseness have not been provided in detail. Accordingly, other embodiments are within the scope of the claims.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system for facilitating hybrid communication according to embodiments and examples described herein.

Some embodiments pertain to Example 1 that includes a method to perform secure transactions with a digital device comprising: receiving by a microphone a signal generated by the digital device, wherein the signal include product information in an inaudible portion of the signal, the product information identifies at least one product that is associated with a timeframe of the signal; generating by a trusted execution environment (TEE) a start signal based on a first sensor signal from a first sensor; verifying by the TEE an origin of the product information to determine an integrity of the origin and data; displaying by a display device a purchasing information to a user, wherein the purchasing information is based on the product information; authenticating the user by the TEE based on a second sensor signal from a second sensor; and completing by the TEE a transaction to purchase the at least one product by providing payment information associated with the user.

Example 2 includes the subject matter of Example 1, further comprising: transmitting by the TEE the product information to a server; and receiving by the TEE from the server the purchasing information associated with the at least one product.

Example 3 includes the subject matter of Example 1, further comprising: retrieving by the TEE a compressed purchasing information that is included in the product information; and processing by the TEE the compressed purchasing information to obtain the purchasing information.

Example 4 includes the subject matter of Example 1, wherein the first sensor is an inertial sensor, the inertial sensor being one of an accelerometer or a gyroscope.

Example 5 includes the subject matter of Example 1, wherein the second sensor is a biometrics sensor.

Example 6 includes the subject matter of Example 1, wherein the signal is an audio signal or an audio-visual signal.

Example 7 includes the subject matter of Example 1, wherein the digital device is one of a digital television, a radio, or a media player.

Example 8 includes the subject matter of Example 7, wherein the at least one product includes products being displayed or audibly referred to during the timeframe of the signal.

Example 9 includes the subject matter of Example 8, wherein the signal is one of a television program, a radio broadcast, or a movie.

Example 10 includes the subject matter of Example 1, further comprising receiving input data from a user that indicates a request to purchase the at least one product.

Some embodiments pertain to Example 11 that includes an apparatus to perform secure transactions with a digital device comprising: a microphone to receive a signal generated by the digital device, wherein the signal include product information in an inaudible portion of the signal, the product information identifies at least one product that is associated with a timeframe of the signal; a plurality of sensors including an inertial sensor to generate a first sensor signal and a biometrics sensor to generate a second sensor signal; a display device to display a purchasing information to a user, wherein the purchasing information is based on the product information; a trusted execution environment (TEE) including a processor to determine a user's intent to perform a secure transaction based on the first sensor signal and to generate a start signal, to verify an origin of the product information to determine an integrity of the origin and data, to authenticate the user based on the second sensor signal, and to complete a transaction to purchase the at least one product by providing payment information associated with the user.

Example 12 includes the subject matter of Example 11, further comprising: a communication interface to transmit the product information to a server, and to receive from the server the purchasing information associated with the at least one product.

Example 13 includes the subject matter of Example 11, wherein the TEE further to retrieve a compressed purchasing information that is included in the product information, and to process the compressed purchasing information to obtain the purchasing information.

Example 14 includes the subject matter of Example 11, wherein the inertial sensor is one of an accelerometer or a gyroscope.

Example 15 includes the subject matter of Example 11, wherein the signal is an audio signal or an audio-visual signal.

Example 16 includes the subject matter of Example 11, wherein the digital device is one of a digital television, a radio, or a media player.

Example 17 includes the subject matter of Example 16, wherein the at least one product includes products being displayed or audibly referred to during the timeframe of the signal.

Example 18 includes the subject matter of Example 17, wherein the signal is one of a television program, a radio broadcast, or a movie.

Example 19 includes the subject matter of Example 11, wherein the processor to receives input data from a user that indicates a request to purchase the at least one product.

Some embodiments pertain to Example 20 that includes a method to perform secure transactions with a digital device comprising: receiving by a microphone a signal generated by the digital device, wherein the signal include metadata in an inaudible portion of the signal, the metadata is associated with a timeframe of the signal; transmitting the metadata to a server that identifies at least one product that is associated with the timeframe of the signal, and a purchasing information associated with the at least one product; generating by a trusted execution environment (TEE) a start signal based on a first sensor signal from a first sensor; verifying by the TEE an origin of a merchant site identified in the purchasing information to determine an integrity of the origin and data; displaying by a display device the purchasing information to a user; authenticating the user by the TEE based on a second sensor signal from a second sensor; and completing by the TEE a transaction to purchase the at least one product by providing payment information associated with the user.

Example 21 includes the subject matter of Example 20, wherein the first sensor is an inertial sensor, the inertial sensor being one of an accelerometer or a gyroscope.

Example 22 includes the subject matter of Example 20, wherein the second sensor is a biometrics sensor.

Example 23 includes the subject matter of Example 20, wherein the signal is an audio signal or an audio-visual signal.

Example 24 includes the subject matter of Example 20, wherein the digital device is one of a digital television, a radio, or a media player.

Example 25 includes the subject matter of Example 24, wherein the at least one product includes products being displayed or audibly referred to during the timeframe of the signal.

Example 26 includes the subject matter of Example 25, wherein the signal is one of a television program, a radio broadcast, or a movie.

Example 27 includes the subject matter of Example 20, further comprising receiving input data from a user that indicates a request to purchase the at least one product.

Some embodiments pertain to Example 28 that includes an apparatus to perform secure transactions with a digital device comprising: a microphone to receive a signal generated by the digital device, wherein the signal include metadata in an inaudible portion of the signal, the metadata is associated with a timeframe of the signal; a communication interface to transmit the metadata to a server that identifies at least one product that is associated with the timeframe of the signal, and a purchasing information associated with the at least one product; a plurality of sensors including an inertial sensor to generate a first sensor signal and a biometrics sensor to generate a second sensor signal; a display device to display a purchasing information to a user, wherein the purchasing information is based on the product information; a trusted execution environment (TEE) including a processor to determine a user's intent to perform a secure transaction based on the first sensor signal and to generate a start signal, to verify an origin of the product information to determine an integrity of the origin and data, to authenticate the user based on the second sensor signal, and to complete a transaction to purchase the at least one product by providing payment information associated with the user.

Example 29 includes the subject matter of Example 28, wherein the inertial sensor is one of an accelerometer or a gyroscope.

Example 30 includes the subject matter of Example 28, wherein the signal is an audio signal or an audio-visual signal.

Example 31 includes the subject matter of Example 28, wherein the digital device is one of a digital television, a radio, or a media player.

Example 32 includes the subject matter of Example 31, wherein the at least one product includes products being displayed or audibly referred to during the timeframe of the signal.

Example 33 includes the subject matter of Example 32, wherein the signal is one of a television program, a radio broadcast, or a movie.

Example 34 includes the subject matter of Example 28, wherein the processor to receive input data from a user that indicates a request to purchase the at least one product.

Some embodiments pertain to Example 35 that includes: At least one non-transitory or tangible machine-readable medium comprising a plurality of instructions, when executed on a computing device, to implement or perform a method or realize an apparatus as claimed in any preceding examples.

Some embodiments pertain to Example 36 that includes a system comprising a mechanism to implement or perform a method or realize an apparatus as claimed in any preceding example.

What is claimed is:

1. A method to perform secure transactions with a digital device comprising:
   receiving by a microphone a signal generated by the digital device, wherein the signal includes product information in an inaudible portion of the signal, the product information identifies at least one product that is associated with a timeframe of the signal;
   generating by a trusted execution environment (TEE) a start signal based on a first sensor signal from a first sensor;
   verifying by the TEE an origin of the product information to determine an integrity of the origin and data, the origin being different than a source of the signal generated by the digital device;
   displaying by a display device purchasing information to a user, wherein the purchasing information is based on the product information;
   authenticating the user by the TEE based on a second sensor signal from a second sensor; and
   completing by the TEE a transaction to purchase the at least one product from the origin by providing payment information associated with the user.

2. The method of claim 1, further comprising:
   transmitting by the TEE the product information to a server; and
   receiving by the TEE from the server the purchasing information associated with the at least one product.

3. The method of claim 1, further comprising:
   retrieving by the TEE a compressed purchasing information that is included in the product information; and processing by the TEE the compressed purchasing information to obtain the purchasing information.

4. The method of claim 1, wherein the first sensor is an inertial sensor, the inertial sensor being one of an accelerometer or a gyroscope.

5. The method of claim 1, wherein the second sensor is a biometrics sensor.

6. The method of claim 1, wherein the signal is an audio signal or an audio-visual signal.

7. The method of claim 1, wherein the digital device is one of a digital television, a radio, or a media player.

8. The method of claim 7, wherein the at least one product includes products being displayed or audibly referred to during the timeframe of the signal.

9. The method of claim 8, wherein the signal is one of a television program, a radio broadcast, or a movie.

10. The method of claim 1, further comprising receiving input data from a user that indicates a request to purchase the at least one product.

11. An apparatus to perform secure transactions with a digital device comprising:
a microphone to receive a signal generated by the digital device, wherein the signal includes product information in an inaudible portion of the signal, the product information identifies at least one product that is associated with a timeframe of the signal;
a plurality of sensors including an inertial sensor to generate a first sensor signal and a biometrics sensor to generate a second sensor signal;
a display device to display a purchasing information to a user, wherein the purchasing information is based on the product information;
a trusted execution environment (TEE) including
a processor
to determine a user's intent to perform a secure transaction based on the first sensor signal and to generate a start signal,
to verify an origin of the product information to determine an integrity of the origin and data, the origin being different than a source of the signal generated by the digital device,
to authenticate the user based on the second sensor signal, and
to complete a transaction to purchase that at least one product from the origin by providing payment information associated with the user.

12. The apparatus in claim 11, further comprising:
a communication interface
to transmit the product information to a server, and
to receive from the server the purchasing information associated with the at least one product.

13. The apparatus of claim 11, wherein the TEE further to retrieve a compressed purchasing information that is included in the product information, and
to process the compressed purchasing information to obtain the purchasing information.

14. The apparatus of claim 11, wherein the inertial sensor is one of an accelerometer or a gyroscope.

15. The apparatus of claim 11, wherein the signal is an audio signal or an audio-visual signal.

16. The apparatus of claim 11, wherein the digital device is one of a digital television, a radio, or a media player.

17. The apparatus of claim 16, wherein the at least one product includes products being displayed or audibly referred to during the timeframe of the signal.

18. The apparatus of claim 17, wherein the signal is one of a television program, a radio broadcast, or a movie.

19. The apparatus of claim 11, wherein the processor is operable to receive input data from a user that indicates a request to purchase the at least one product.

20. A method to perform secure transactions with a digital device comprising:
receiving by a microphone a signal generated by the digital device, wherein the signal includes metadata in an inaudible portion of the signal, the metadata is associated with a timeframe of the signal;
transmitting the metadata to a server that identifies at least one product that is associated with the timeframe of the signal, and & purchasing information associated with the at least one product;
generating by a trusted execution environment (TEE) a start signal based on a first sensor signal from a first sensor;
verifying by the TEE an origin of a merchant site identified in the purchasing information to determine an integrity of the origin and data, the origin being different than a source of the signal generated by the digital device;
displaying by a display device the purchasing information to a user;
authenticating the user by the TEE based on a second sensor signal from a second sensor; and
completing by the TEE a transaction to purchase the at least one product from the merchant site by providing payment information associated with the user.

21. The method of claim 20, wherein the first sensor is an inertial sensor, the inertial sensor being one of an accelerometer or a gyroscope, and wherein the second sensor is a biometrics sensor.

22. At least one non-transitory machine-readable medium comprising a plurality of instructions, executed on a computing device, to facilitate the computing device to perform one or more operations comprising:
receiving by a microphone a signal generated by the digital device, wherein the signal include product information in an inaudible portion of the signal, the product information identifies at least one product that is associated with a timeframe of the signal;
generating by a trusted execution environment (TEE) a start signal based on a first sensor signal from a first sensor;
verifying by the TEE an origin of a merchant site identified in the purchasing information to determine an integrity of the origin and data, the origin being different than a source of the signal generated by the digital device;
displaying by a display device purchasing information to a user, wherein the purchasing information is based on the product information;
authenticating the user by the TEE based on a second sensor signal from a second sensor; and
completing by the TEE a transaction to purchase the at least one product from the merchant site by providing payment information associated with the user.

23. The machine-readable medium of claim 22, wherein the first sensor is an inertial sensor, the inertial sensor being one of an accelerometer or a gyroscope, and wherein the second sensor is a biometrics sensor.

* * * * *